United States Patent
Bailey

(10) Patent No.: US 6,216,752 B1
(45) Date of Patent: Apr. 17, 2001

(54) GRAVITY FEED RESIN DELIVERY SYSTEM FOR VARTM FABRICATION

(75) Inventor: Mark L. Bailey, Redondo Beach, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/282,773

(22) Filed: Mar. 31, 1999

(51) Int. Cl.[7] .................................................. B65B 1/04
(52) U.S. Cl. ................................. 141/236; 425/572
(58) Field of Search ................................. 141/236, 237; 425/572

(56) References Cited

U.S. PATENT DOCUMENTS

| | | | |
|---|---|---|---|
| 2,913,036 | 11/1959 | Smith | 154/1.6 |
| 3,146,148 | 8/1964 | Mitchella et al. | 156/382 |
| 4,132,755 | 1/1979 | Johnson | 264/553 |
| 4,280,804 | 7/1981 | Holland | 425/388 |
| 4,307,760 * | 12/1981 | Hauser | 141/82 |
| 4,359,437 | 11/1982 | Le Comte | 264/627 |
| 4,500,279 * | 2/1985 | Develljan et al. | 425/548 |
| 4,560,523 | 12/1985 | Plumley et al. | 264/102 |
| 4,676,041 | 6/1987 | Ford | 52/309.11 |
| 4,780,262 | 10/1988 | Von Volkli | 264/512 |
| 4,824,017 | 4/1989 | Mansfield | 239/9 |
| 4,854,504 | 8/1989 | Hedger, Jr. et al. | 239/294 |
| 4,902,215 | 2/1990 | Seemann, III | 425/406 |
| 4,942,013 | 7/1990 | Palmer et al. | 264/511 |
| 4,964,795 * | 10/1990 | Tooman | 425/144 |
| 5,000,990 | 3/1991 | Freeman | 428/36.1 |
| 5,009,821 | 4/1991 | Weaver | 264/22 |
| 5,035,602 | 7/1991 | Johnson | 425/468 |
| 5,041,260 | 8/1991 | Johnson et al. | 264/510 |
| 5,045,251 | 9/1991 | Johnson | 264/40.1 |
| 5,052,906 | 10/1991 | Seemann | 425/112 |
| 5,096,651 | 3/1992 | Le Comte | 264/510 |
| 5,132,069 | 7/1992 | Newton | 264/257 |
| 5,169,571 | 12/1992 | Buckley | 264/22 |
| 5,183,619 | 2/1993 | Tolton | 264/257 |
| 5,215,322 | 6/1993 | Enders | 280/231 |
| 5,266,139 | 11/1993 | Yokota et al. | 156/169 |
| 5,275,372 | 1/1994 | Boeckeler | 249/134 |
| 5,281,388 | 1/1994 | Palmer et al. | 264/571 |
| 5,298,212 | 3/1994 | Stecker | 264/571 |
| 5,316,462 | 5/1994 | Seemann | 425/112 |
| 5,322,665 | 6/1994 | Bernardon et al. | 264/571 |
| 5,388,768 | 2/1995 | Moses | 239/417 |

(List continued on next page.)

OTHER PUBLICATIONS

Mold—Masters, 5 pages, 1986.*
Abstract: E. Mcclure Notes:*Recirculation Molding* Feb. 24, 1998.
Article: Scott M. Lewit and John C. Jakabowski, Structural Composites, Inc. and Navy CECMT Marine Composites Technology Center *Recireulation Molding–Recent Advances in Applications and Equipment* pp. 1–22, no date.
Article: Gerry Kobe *Chrysler Molds The Future* Manufacturing pp. 58–60 Nov. 1997.

*Primary Examiner*—Steven O. Douglas
(74) *Attorney, Agent, or Firm*—Terry J. Anderson; Karl J. Hoch, Jr.

(57) ABSTRACT

A gravity feed resin delivery system for VARTM fabrication of a fiber-reinforced resin structure formed upon a mold surface. The system is provided with a resin source for dispensing catalyzed liquid resin. A resin manifold is disposed above the mold surface. The resin manifold has a manifold inlet port for receiving the resin from the resin source. The resin manifold further has a plurality of manifold outlet ports lengthwise distributed there along for draining resin therethrough. The system is further provided with a plurality of resin infusion lines which extend between the resin manifold to adjacent the mold surface. Each of the resin infusion lines are in fluid communication with a respective manifold outlet port for receiving resin drained therethrough.

21 Claims, 3 Drawing Sheets

U.S. PATENT DOCUMENTS

| | | | |
|---|---|---|---|
| 5,403,537 | 4/1995 | Seal et al. | 264/511 |
| 5,407,610 | 4/1995 | Kohoma et al. | 264/22 |
| 5,432,010 | 7/1995 | Ko et al. | 428/542.8 |
| 5,439,635 | 8/1995 | Seemann | 264/510 |
| 5,480,603 | 1/1996 | Lopez et al. | 264/131 |
| 5,484,277 | 1/1996 | Lindsay | 425/388 |
| 5,500,164 | 3/1996 | Livesay et al. | 264/459 |
| 5,516,271 | 5/1996 | Swenor et al. | 425/127 |
| 5,540,497 | 7/1996 | Addeo et al. | 366/159.1 |
| 5,549,246 | 8/1996 | Kukesh | 239/9 |
| 5,576,030 | 11/1996 | Hooper | 425/112 |
| 5,588,392 | 12/1996 | Bailey | 114/357 |
| 5,639,027 | 6/1997 | Fritz | 239/414 |
| 5,641,525 | 6/1997 | Yakel | 425/390 |
| 5,665,301 | 9/1997 | Alanko | 264/571 |
| 5,678,591 | 10/1997 | Merrifield et al. | 137/208 |
| 5,702,663 | 12/1997 | Seemann | 264/510 |
| 5,721,034 | 2/1998 | Seeman, III et al. | 428/71 |
| 5,733,494 | 3/1998 | Moore | 264/258 |
| 5,741,450 | 4/1998 | Monroe | 264/102 |

\* cited by examiner

GRAVITY FEED RESIN DELIVERY SYSTEM FOR VARTM FABRICATION

FIELD OF THE INVENTION

The present invention relates generally to vacuum assisted resin transfer molding (VARTM) fabrication, and more particularly to a gravity feed resin delivery system.

BACKGROUND OF THE INVENTION

Vacuum assisted resin transfer molding (VARTM) and related processes and techniques have been widely used to fabricate relatively large fiber-reinforced composite articles. Such articles may include coach chassis for busses and trailers and fiber glass boat hulls, for example.

In general, the VARTM process includes the distribution of dry, fiber strips, plies or mats about the surface of a female mold to form a fiber lay-up of a desired thickness. The fiber strips or plies may take the form of a cloth or sheet of fibers of glass, carbon or other suitable material. In addition, one or more rigid core layers may be included. The core layers may be formed of a solid foam material or balsa wood. The core layers may be sandwiched between the fiber plies to form a fiber/core composite lay-up or laminate.

A flexible, fluid impermeable bag, sheet or covering is positioned atop the exposed lay-up and sealed about the periphery thereof. A relative vacuum is drawn between the mold and the bag, thereby causing the bag to compress against the fiber lay-up. A chemically catalyzed liquid resin is introduced into the evacuated bagged mold through a series of resin supply lines or conduits. A multitude of individual resin supply lines may be used so as to facilitate distributed wetting or infusion of the liquid resin about the fiber lay-up. The vacuum source and resin supply lines are strategically positioned relative to one another in a manner which encourages controlled wetting. In this respect, the vacuum source may be applied at one side of the fiber lay-up and the resin introduced at an opposing side, and thus tending to cause the resin to be pulled across and wet portions of the fiber lay-up therebetween.

Underwetting and overwetting of the fiber lay-up are particularly problematic, as such conditions may result in unacceptable structural weaknesses and deficiencies of the resultant article. In addition, nonuniform resin distribution may also result in unacceptable structural weaknesses and deficiencies of the resultant article.

Some of the contemporary techniques for facilitating more uniformed or homogeneous resin distribution include the use of redundant resin delivery apparatus. As such, when fabricating large structures, often several dozen individual resin reservoirs or pumping systems may surround the mold surface. Each of the resin reservoirs are then connected to lengthy resin supply lines to selective localized resin application areas or zones about the mold surface. While these techniques enhance the distribution of resin about the fiber lay-up, such a techniques results in undue inefficient multiplicity of the resin delivery apparatus. Operators must monitor the many resin delivery apparatus subcomponents which increases the time and skill requirements in order to fabricate a resultant article to desired quality control standards. For example, in the event one of the resin supply reservoirs runs dry during the fabrication process, the entire resultant reinforced resin part is often scrapped. While such labor intensive steps and equipment intensive processes, including inspection tasks, may result in a structure which conforms to desired mechanical requirements, such a process so limits the production efficiency so as to make the process economically nonfeasible.

In addition, as mentioned above, the contemporary resin distribution techniques require a multitude of lengthy resin supply lines about the mold surface. Such supply lines are distributed about the surrounding floor surface and create a physical tripping hazard.

As such, based upon the foregoing, there exists a need in the art for an improved device for enhancing ans simplifying resin distribution in comparison to the prior art.

SUMMARY OF THE INVENTION

In accordance with the present invention, there is provided a simple gravity feed resin delivery system for VARTM fabrication of large fiber-reinforced resin structures formed upon a mold surface. The system is provided with a resin source for dispensing catalyzed liquid resin. A resin manifold is disposed above the mold surface. The resin manifold has a manifold inlet port for receiving the resin from the resin source. The resin manifold further has a plurality of manifold outlet ports lengthwise distributed there along for draining resin therethrough. The system is further provided with a plurality of resin infusion lines which extend between the resin manifold to adjacent the mold surface. Each of the resin infusion lines are in fluid communication with a respective manifold outlet port for receiving resin drained therethrough.

In the preferred embodiment of the present invention, the resin manifold is a generally elongate tubular structure which extends substantially along the mold surface. In this respect, the resin manifold is preferably formed cardboard tubing and the resin outlet ports are generally circular apertures which may be simply formed therein by drilling or puncturing the resin manifold. The resin infusion lines are cooperatively sized to mate with the resin outlet ports via insertion therethrough in sealed communication therewith.

The present invention for the delivery of resin during VARTM fabrication presents numerous advantages not found in the related prior art. In particular, the system takes full advantage of gravity for distributing resin from the resin manifold to the various resin infusion lines. Thus, only a single resin pump is required for large resin structures. In addition, due to the relatively close proximity of the resin manifold to the mold surface (i.e., directly above), the attached resin infusion lines are relatively short. As such, this tends to improve worker safety, minimizes material costs and improves part quality. Further, it is contemplated that undue redundancy within the resin delivery system is mitigated because there is provided a single central resin manifold. Thus, a multiplicity of catalyzed resin reservoirs or buckets is avoided which are typically employed in the art.

Advantageously, it is contemplated that the resin manifold may be formed of readily available inexpensive cardboard tubing. Furthermore, the manifold inlet and outlets may easily be formed therein via simple drilling or punching fabrication steps. Thus, the resin manifold may be considered economically disposable. Whereas, other more expensive prior art manifold apparatus may have to undergo flushing or cleaning steps for reuse.

As such, the present invention represents an advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
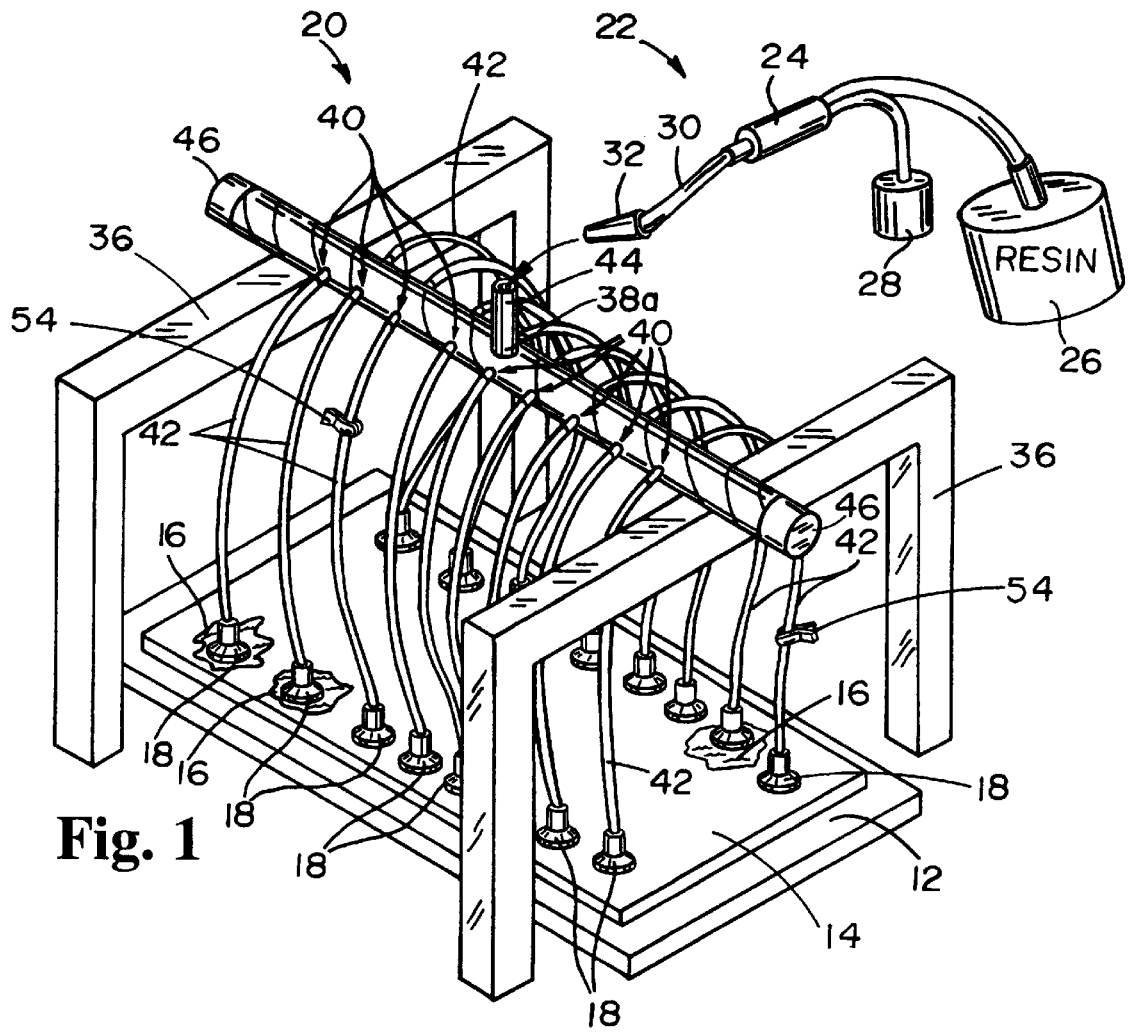
FIG. 1 is a perspective view of the resin delivery system of the present invention shown in operable relationship with a fiber-reinforced lay-up distributed upon a mold.

Referring now to the drawings wherein the showings are for purposes of illustrating a preferred embodiment of the present invention only, and not for purposes of limiting the same, FIGS. 1–5 illustrate an apparatus for resin distribution during VARTM fabrication of a fiber-reinforced resin structure.

Referring now to FIG. 1, there is depicted a mold 10 which is used to fabricate fiber-reinforced resin structures. The mold 10 has a mold surface 12. The mold 10 is sized and configured to conform to the shape of desired resultant product. In this respect, the mold 10 is symbolically representative. As depicted the mold 10 is generally planar. It is contemplated, however, that the mold surface 12 may have regions which are aligned to be horizontal, vertical and at other angular orientations. Further, it is contemplated that the mold surface 12 may have generally planar portions as well as those which or curved or irregularly shaped.

The VARTM process of forming fiber-reinforced resin structures typically begins with the distribution of a fiber-reinforced lay-up 14 about the mold surface 12. The fiber-reinforced lay-up 14 includes one or more fiber-reinforced plies which take the form of a cloth or sheet of fibers of glass, carbon or other suitable materials. In addition, one or more rigid core layers may be included. The core layers may be formed of a solid foam material, balsa wood or other suitable materials. The core layers may be sandwiched between the fiber-reinforced plies to form the fiber-reinforced lay-up 14 which is a fiber/core composite laminate. The methods, materials and apparatus for distributing and forming the fiber-reinforced lay-up 14 upon the mold surface 12 are chosen from those which are well known to one of ordinary skill in the art.

Although not depicted, it is contemplated that the VARTM process further provides for a flexible, fluid impermeable bag or covering positioned atop the fiber-reinforced lay-up 14. The periphery of the covering is sealed against the mold surface 12 thereby bagging the fiber-reinforced lay-up 14 therein. A relative vacuum is drawn between the mold 10 and the covering, thereby causing the covering to compress and collapse against the fiber-reinforced lay-up 14, according to those methods which are well known to one of ordinary skill in the art. In this respect, vacuum application ports are selectively distributed about the mold 10, preferably about the periphery thereof. It is contemplated that other methods and apparatus may be employed to provide the desired vacuum draw and are chosen from those which are well known to one of ordinary skill in the art.

Further, according to the typical VARTM fabrication process, a chemically catalyzed liquid resin 16 is dispensed about the fiber-reinforced lay-up 14. In this respect, resin infusion ports 18 are selectively distributed about the mold 10 with respect to the vacuum application ports to facilitate resin infusion or wetting into the fiber-reinforced lay-up 14. The resin infusion ports 18 and methods for selectively distributing the same are chosen from those which are well known to one of ordinary skill in the art. The resin infusion ports 18 may be disposed through the covering or at the periphery thereof and may be sealed thereat.

In accordance with the present invention, there is provided a gravity feed resin delivery system 20 for VARTM fabrication of a fiber-reinforced resin structure formed upon the mold surface 12. The system 20 is provided with a catalyzed resin source 22 which preferably includes a meter-mix apparatus 24 which is in fluid communication with a resin reservoir 26 and a resin catalyst reservoir 28. The meter-mix apparatus 24 is provided with a supply line 30 which terminates at a nozzle 32. It is contemplated that other apparatus for dispensing catalyzed liquid resin 16 may be chosen from those which are well known to those of ordinary skill in the art.

The resin delivery system 20 of the present invention, is further provided with a resin manifold 34. Importantly, the resin manifold 34 is disposed above the mold surface 12. Structural supports 36, symbolically depicted, are preferably provided to position the resin manifold 34 above the mold surface 12. The resin manifold 34 has a manifold inlet port 38 for receiving the catalyzed resin 16 from the resin source 22. The resin manifold 34 further has a plurality of manifold outlet ports 40 lengthwise distributed there along for draining the catalyzed resin 16 therethrough. Resin 16 which is dispensed into the resin manifold 34 tends to drain through the manifold outlet ports 40 due to the effects of gravity and the pull of the vacuum. As such, the present resin delivery system 20 is a gravity feed one which does not require any pumps to encourage flow through the system 20 other than that which may be used to dispense resin 16 into the resin manifold 34.

The gravity feed resin distribution system 20 is further provided with a plurality of resin infusion lines 42 which extend between the resin manifold 34 to adjacent the mold surface 12. The resin infusion lines 42 are disposed in fluid communication with respective ones of the manifold outlet ports 40 for receiving resin 16 drained therethrough. The resin infusion lines 42 are further in fluid communication with the resin infusion ports 18 for dispensing the catalyzed resin 16 thereat.

In the preferred embodiment of the present invention, the resin manifold 34 is a generally elongate tubular structure which extends substantially along the mold surface 12. The resin manifold 18 is preferably formed of tubing comprised of a paper, such as cardboard. Advantageously, it is contemplated that cardboard tubing is widely available in virtually any sizing and is relatively inexpensive. The resin manifold 34 may be formed of other suitable materials which may be chosen from those which are well known to one of ordinary skill in the art, such as plastic for example. In the case of a paper or paper like material, it is contemplated that the interior surface thereof could be covered or sealed so a to mitigated against saturation and therefore structural weakening thereof. For example, the interior surface could be covered with a film of wax or plastic. In addition, it is contemplated that the interior surface of the resin manifold 18 may be coated with a material with tends to mitigate against the resin adhering thereto so as to facilitate the flow of resin.

Figure 2:
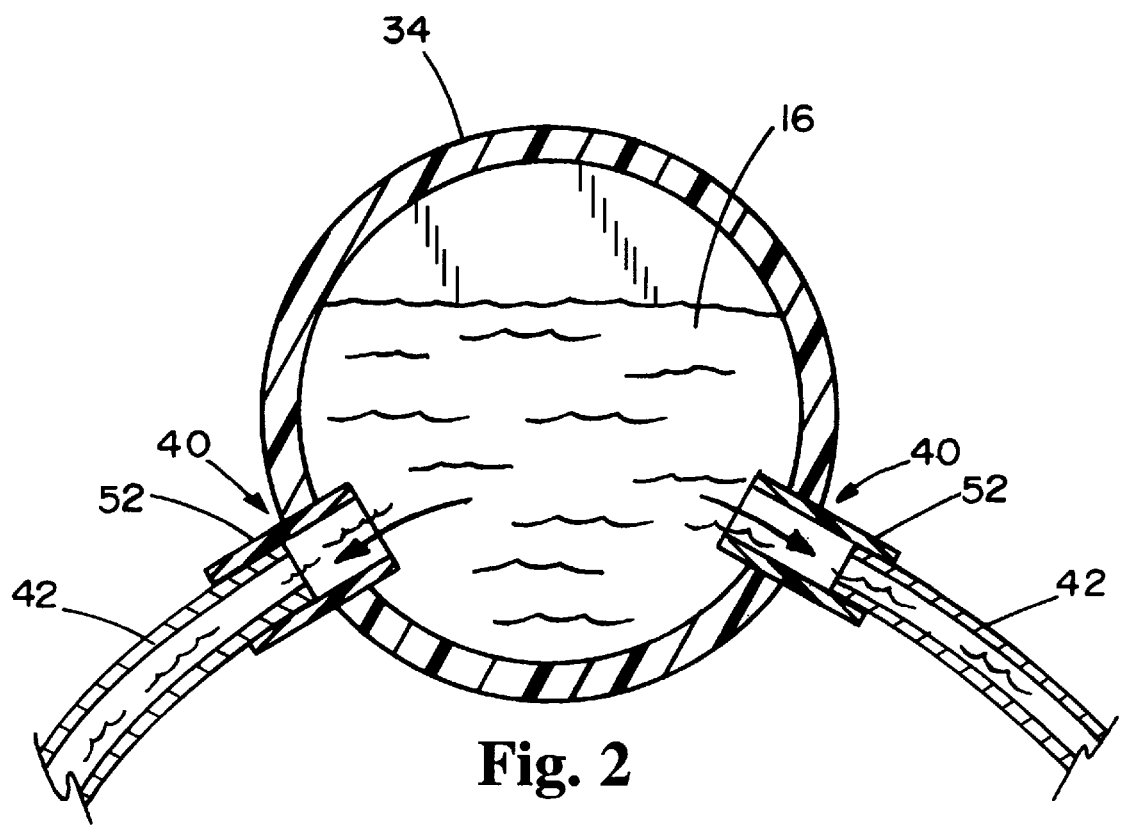
FIG. 2 is a cross-sectional view of the resin manifold of FIG. 1.
Figure 3:
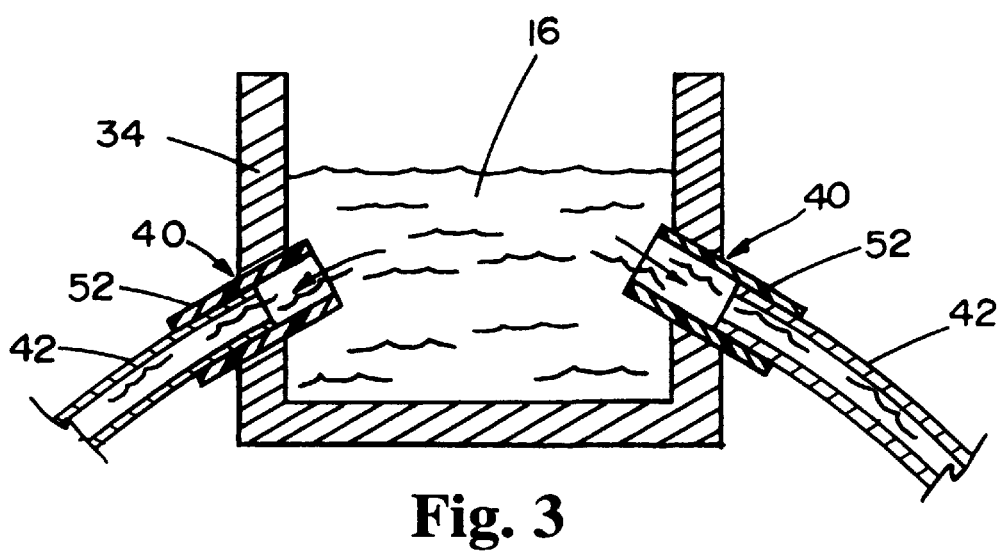
FIG. 3 is a cross-sectional view of an alternate embodiment of the resin manifold of the resin delivery system of the present invention.

The resin manifold 34 is required to have a wall thickness sufficient for the resin manifold 34 to be supportive of the resin manifold 34 being filled with the resin 16. The resin manifold 34 may be formed to have a circular cross-section, as depicted in FIG. 2. Alternatively, the resin manifold 34 may be formed to have a rectangular cross-section, as depicted in FIG. 3, or any other cross-sectional shape. Further, the resin manifold 34 may have a closed cross-section, as depicted in FIG. 2, or an open one, as depicted in FIG. 3. A closed configuration is preferred to minimize undesirable emissions into the surrounding work environment.

Figure 4:
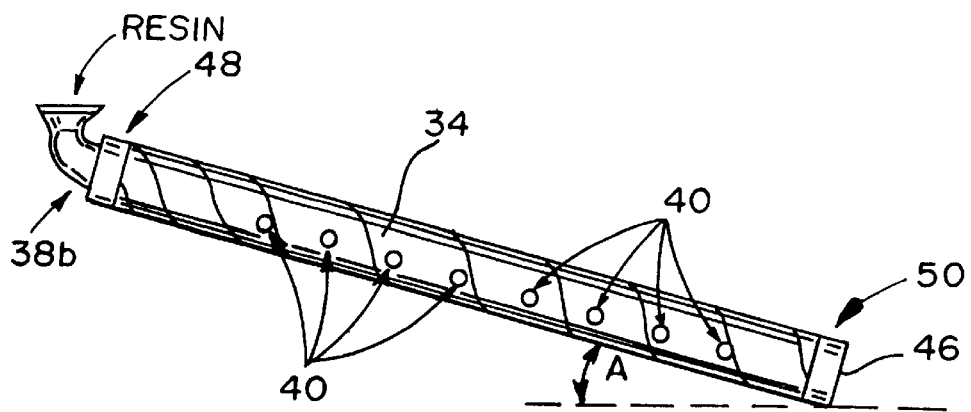
FIG. 4 is a side view of another alternate embodiment of the resin manifold of the resin delivery system of the present invention.

In the preferred embodiment of the present invention, the resin manifold 34 is disposed horizontally above the mold surface 14. The manifold inlet port 38a is centrally formed at the top facing portion of the resin manifold 34. The resin manifold 34 may further have a funnel portion 44 which is sized and configured to sealably mate with the manifold inlet port 38a for receiving dispensed resin 16 therethrough. In addition, the tubular resin manifold 34 may have opposing ends which are sealed via a pair of caps 46. Referring now to FIG. 4, in an alternate embodiment of the resin manifold 34, the resin manifold 34 has first and second ends 48, 50 thereof with the manifold inlet port 38b being disposed at the first end 48. The first end 48 of the resin manifold 34 is disposed above or elevated with respect to the second end 50 thereof. As such, resin 16 introduced into the resin manifold 34 through the first end 48 tends to flow towards the second end 50 due to the effects of gravity. In either embodiment of the resin manifold 34, in order to ensure a constant resin flow through the resin manifold 34, an operator need only maintain the resin manifold 34 in a filled capacity by visually monitoring the resin level within the funnel portion 44.

The resin outlet ports 40 are preferably circular apertures which may be formed therein by drilling or puncturing the resin manifold 34. The resin infusion lines 42 are cooperatively sized to mate with the resin outlet ports 40 via insertion therethrough in sealed communication therewith. In this respect, the resin infusion lines 42 may each be provided with a coupling 52 which is sized and configured to link in fluid communication the resin infusion lines 42 with the manifold outlet ports 40 of the resin manifold 34. Other supporting apparatus may be provided to connect the resin infusion lines 42 to the resin manifold 34 which are chosen from those which are well known to one of ordinary skill in the art. In addition, the resin infusion lines 42 are preferably formed of a plastic tubing material, although other suitable materials may be chosen from those which are well known to one of ordinary skill in the art.

It is contemplated that upon sufficient wetting or infusion of the fiber-reinforced lay-up 14, the dispensing of the resin 50 thereto is ceased. It is contemplated that the supply of resin 16 flowing to the resin infusion ports 18 may be controlled by simply interrupting flow through desired ones of the resin infusion lines 42. Such interruption may be facilitated by the application of line clamps 54. The infused fiber-reinforced lay-up 14 is allowed to cure according to those methods which are well known to one of ordinary skill in the art. After the curing, the resultant fiber-reinforced resin structure is removed from the mold 10.

Figure 5:
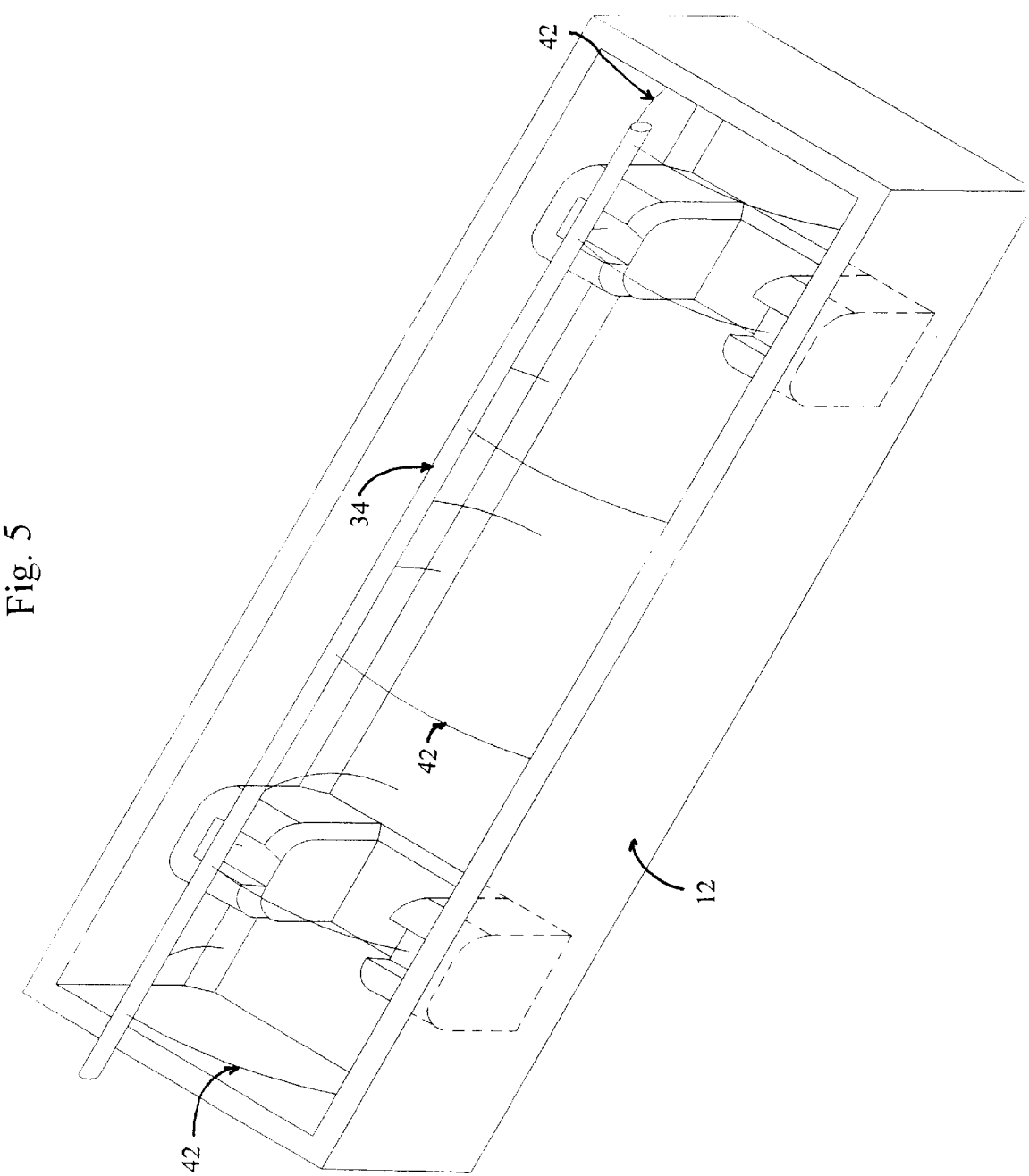
FIG. 5 is a perspective view of an embodiment of the resin delivery system of the present invention as utilized in conjunction with a bus chasis.

Referring now to FIG. 5, there is depicted a mold surface 12 which is sized and configured to the shape of a bus chasis. In this respect, the resin manifold 34 is partucualarly adapted to be used in conjuction with relatively large structures. As is shown, the resin manifold 34 may sized so as be generally the same length as the mold surface 12. The resin infusion lines 42 are distributed along the resin mainfold 34 and terminate about the mold surface 12.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A gravity feed resin delivery system for VARTM fabrication of a fiber-reinforced resin structure formed upon a mold surface, the system comprises:
   a resin source for dispensing catalyzed liquid resin;
   a single use resin manifold disposed above the mold surface, the resin manifold having a manifold inlet port connectable with the resin source for receiving the resin, the resin manifold having a plurality of manifold outlet ports lengthwise distributed there along for draining resin therethrough; and
   a plurality of resin infusion lines extending between the resin manifold to adjacent the mold surface, each of the resin infusion lines being in fluid communication with a respective manifold outlet port for receiving resin drained there through, the resin infusion lines additionally being connectable with the manifold outlet ports such that the resin manifold can be replaced when hardened resin accumulations therein terminate manifold usage by obstructing resin flow there through.

2. The resin delivery system of claim 1 wherein the resin manifold being generally elongate and extending substantially along the mold surface.

3. The resin delivery system of claim 1 wherein the resin manifold being a generally tubular structure.

4. The resin delivery system of claim 3 wherein the resin manifold having a circular cross-section.

5. The resin delivery system of claim 3 wherein the resin manifold having a rectangular cross-section.

6. The resin delivery system of claim 1 wherein the resin manifold having closed ends thereof.

7. The resin delivery system of claim 1 wherein the manifold inlet port being centrally disposed about the resin manifold.

8. The resin delivery system of claim 1 wherein the manifold is disposed horizontally.

9. The resin delivery system of claim 1 wherein the resin manifold being formed of a paper material.

10. The resin delivery system of claim 9 wherein the resin manifold being formed of a cardboard material.

11. The resin delivery system of claim 1 wherein the resin source comprises a meter mix apparatus disposable in fluid communication with liquid resin and liquid resin catalyst.

12. The resin delivery system of claim 1 wherein the resin outlet ports generally being circular apertures formed in the resin manifold, the resin infusion lines being cooperatively sized to mate with the resin outlet ports via insertion therethrough in sealed communication therewith.

13. The resin delivery system of claim 1 wherein the resin manifold further comprises a funnel portion in sealed communication with the resin inlet port for receiving and channeling resin into and through the resin inlet port.

14. The resin delivery system of claim 1 wherein the resin source is meter-mixed.

15. The resin delivery system of claim 1 wherein the mold surface has a length and the resin manifoled is generally the same length as the mold surface.

16. The resin delivery system of claim 15 wherein the the mold surface is formed in the shape of a bus chasis.

17. The resin delivery system of claim 1 wherein the resin manifold is formed from a polymer material.

18. A gravity feed resin delivery system for VARTM fabrication of a fiber-reinforced resin structure formed upon a mold surface, the system comprises:

a resin source for dispensing catalyzed liquid resin;

a single use resin manifold disposed above the mold surface, the resin manifold having a manifold inlet port connectable with the resin source for receiving the resin, the resin manifold being formed to be generally elongate and tubular and extending substantially along the mold surface, the resin manifold having a plurality of manifold outlet ports lengthwise distributed there along for draining resin there through; and a plurality of resin infusion lines extending between the resin manifold to adjacent the mold surface, each of the resin infusion lines being in fluid communication with a respective manifold outlet port for receiving resin drained there through, the resin infusion lines additionally being connectable with the manifold outlet ports such that the resin manifold can be replaced when hardened resin accumulations therein terminate manifold usage by obstructing resin flow there through.

19. A gravity feed resin delivery system for VARTM fabrication of a fiber-reinforced resin structure formed upon a mold surface, the system comprising:

a resin source for dispensing catalyzed liquid resin;

a resin manifold disposed above the mold surface, the manifold being constructed from a paper material and having an interior resin saturation mitigation coating formed therein, the manifold additionally having an inlet port for receiving the resin from the resin source and a plurality of manifold outlet ports lengthwise distributed there along for draining resin therethrough; and a plurality of resin infusion lines extending between the resin manifold to adjacent the mold surface, each of the resin infusion lines being in fluid communication with a respective manifold outlet port for receiving resin drained therethrough.

20. A gravity feed resin delivery system for VARTM fabrication of a fiber-reinforced resin structure formed upon a mold surface, the system comprising:

a resin source for dispensing catalyzed liquid resin;

a resin manifold disposed above the mold surface, the manifold being constructed from a paper material and having an interior resin adhesion mitigation coating formed therein, the manifold additionally having an inlet port for receiving the resin from the resin source and a plurality of manifold outlet ports lengthwise distributed there along for draining resin therethrough; and a plurality of resin infusion lines extending between the resin manifold to adjacent the mold surface, each of the resin infusion lines being in fluid communication with a respective manifold outlet port for receiving resin drained there through.

21. A gravity feed resin delivery system for VARTM fabrication of a fiber-reinforced resin structure formed upon a mold surface, the system comprising:

a resin source for dispensing catalyzed liquid resin;

a resin manifold being disposed above the mold surface, the manifold having an inlet port for receiving the resin from the resin source, the manifold having a plurality of manifold outlet ports lengthwise distributed there along for draining resin therethrough; and a plurality of resin infusion lines formed of flexible plastic tubing and extending between the resin manifold to adjacent the mold surface, each of the resin infusion lines being in fluid communication with a respective manifold outlet port for receiving resin drained there through.

* * * * *